United States Patent [19]

Horvei

[11] Patent Number: 4,921,003
[45] Date of Patent: May 1, 1990

[54] SHUT-DOWN VALVE

[75] Inventor: Knut Horvei, Sandnes, Norway

[73] Assignee: Den norske stats olkeselskap, Norway

[21] Appl. No.: 83,786

[22] PCT Filed: Oct. 3, 1985

[86] PCT No.: PCT/NO85/00062
 § 371 Date: Apr. 22, 1988
 § 102(e) Date: Apr. 22, 1988

[87] PCT Pub. No.: WO87/02094
 PCT Pub. Date: Apr. 9, 1987

[51] Int. Cl.$^5$ ............................................. F16K 43/00
[52] U.S. Cl. .................................... 137/315; 251/58; 251/298
[58] Field of Search ......................... 137/315, 320, 629; 251/58, 228, 298, 299, 62, 63.5, 63.6, 339, 349, 353

[56] References Cited

U.S. PATENT DOCUMENTS

| | | | |
|---|---|---|---|
| 1,120,905 | 12/1914 | Chrisman | 137/315 |
| 1,818,508 | 8/1931 | Scott | 251/339 |
| 2,877,790 | 3/1959 | Wilhelm et al. | 251/339 |
| 2,921,601 | 1/1960 | Fisher, Jr. | 251/339 |
| 3,557,822 | 1/1971 | Chronister | 137/315 |
| 3,665,953 | 5/1972 | Chronister | 137/315 |
| 3,799,188 | 3/1974 | Chronister | 137/315 |
| 3,799,258 | 3/1974 | Tausch | 251/62 |
| 3,845,818 | 11/1974 | Deaton | 137/629 |
| 4,307,747 | 12/1981 | Carpentier | 137/315 |
| 4,498,492 | 2/1985 | Carpentier | 137/315 |
| 4,547,099 | 10/1985 | Alexandrov et al. | 251/298 |

Primary Examiner—George L. Walton
Attorney, Agent, or Firm—Lucas & Just

[57] ABSTRACT

Shut-down valve intended for use in a subwater/subliquid position, for instance in subsea pipelines for liquid/gas. It is an object to prevent the medium surrounding the valve, to penetrate the pipesystem which is being served by the valve, and at the same time counteract the through-flowing fluid to be released into the surrounding medium when the valve is to undergo maintenance. The valve comprises a valve housing comprising a cylindrical valve chamber (12,13), which is intended for being oriented along the direction of flow F of the liquid/gas, and a radially arranged valve chamber (14), which is closable with a removable bonnet (9), and also a clack-valve body (3) which is movable between a closed position and an open position. The shut-down valve is characterized by a clack-valve body (3) pivotally mounted to the bonnet (9) and the valve is provided with a trunk piston (7) which is axially displaceable in the cylindrical valve chamber (12,13) of the valve housing between an advanced position where it extends over the radial valve chamber (14) of the valve housing and in this way is separating it from the cylindrical valve chamber (12,13), in such a way that maintenance may occur without the surrounding medium coming into contact with the through-flowing fluid and a retracted position in which the trunk piston is retracted from the area of the radial valve chamber (14).

3 Claims, 2 Drawing Sheets

SHUT-DOWN VALVE

TECHNICAL FIELD

This invention relates to a quick-acting shut-down valve for use in a submerged state in water, liquids or other fluids and particularly a shut-down valve for employment in subwater/subliquid position, for instance in subsea pipelines for liquid/gas. Typically, such a valve comprises a valve housing including a cylindrical valve chamber which is intended for being orientated along the direction of flow of the liquid/gas, and a radially placed valve chamber which is closable with a removable bonnet. Generally, the valve has a clack-valve body which is movable between an active closed position, cooperating tightly with a seat in the valve housing, and an inactive position, in which the valve is open for through-flowing of liquid/gas.

So far it has been difficult to provide a shut-down valve for installation on pipelines, which is in case of an accident or major failure is able to prevent considerable amounts of hydrocarbons returning to the origin. Maintenance and change of components in valves commonly used to day are associated with considerable expenses, due to the extensive requirements being necessary for such operations.

As an example it can be mentioned that when using conventional shut-down valves on a pipeline like for instance Statpipe, the line will be filled up with water in case the valve is opened for repair. Afterwards it will take about 60 days to empty the water out of the pipeline and dry it up as well, before it can be used again for transporting gas/oil. This will involve loss of production during this period with large economical consequences.

During cleansing of the pipeline, about 200 tons of dirt/particles passes through the pipe and the valve, when sending a body with the flow through the pipe and the valve. In order to prevent this body from becoming stuck, the pipe has to be continuous without cavities and edges. It is also desirable to protect moving parts of the valve against intruding of dirt/particles and heavy hydrocarbons, since these stick to and cause corrosions and coking wherever they penetrate. Accordingly, the shut-down valve will have a design that makes it possible to lead a body/liquid/gas through a continuous "pipe" through the valve. Said body can also be a so-called "pig", which is an object which might be sent through the pipe in order to clean it, or a "linalog", which is a so-called "intelligent pig", i.e. a recording/measuring device adapted for measuring conditions in the pipe.

From FR Pat. No. 1594134 it is known a shut-down valve of the art with a shut-down clock which comprises a trunk piston able to be moved between two positions in the longitudinal direction of the conduit, in which when the trunk piston is in an advanced position, it will separate an adjoining chamber in which the valve clock is mounted on the wall of the chamber. The valve according to said French patent is particularly used in nuclear power industry.

From U.S. Pat. No. 419,074 it is known a pressure equalizing clack valve in which the valve housing comprises a cover member into which the clack can be pivoted. Said arrangement permits maintenance to be carried out on the clack through the opening of the valve housing, when the cover member is removed.

DISCLOSURE OF INVENTION

An object according to the invention is to provide a shut-down valve, in which the fluid (water/liquid) surrounding the valve, is prevented from penetrating the pipe system, which is being served by the valve, and which at the same time is able to counteract the through flowing fluid (liquid/gas) from flowing out and into the surrounding medium when the valve is undergoing maintenance, repair and/or change of components, like valve packing faces, packings, valve stem, shut-down devices etc., and this will be achieved without it being necessary to encapsulate the valve or build it into a housing, a chamber or the like or cover it in any other ways.

While the valve is in an open position, and said cover is removed, it is possible to carry out maintenance on the valve, to change components like packings, seat, shut-down device etc. without releasing liquid/gas, flowing through the pipesystem into the surrounding medium, even if the valve is open. At the same time the surrounding medium (liquid/water) is prevented from penetrating into the pipesystem. In operation, packing rings, seats and similar components will be protected against contamination and wearing from dirt/particles passing through the valve together with the gas/oil/liquid flow.

According to the invention this is obtained by a shut-down valve which is characterized by a clack-valve body (3) pivotably mounted to the bonnet (9), which valve is provided with a trunk piston (7) which is axially displaceable in the cylindrical valve chamber (12, 13) of the valve housing between an advanced position trunk piston which extends over the radial valve chamber (14) of the valve housing and in this way separates it from the cylindrical valve chamber (12, 13) in such a way that maintenance/change of valve components may occur without the surrounding medium coming into contact with the through-flowing fluid, and a retracted position in which it is retracted from the area of the radial valve chamber.

Advantageous embodiments representing further developments of the invention are characterized by:

the trunk piston (7) has a radially protruding collar (7') which by influence of pressure and vacuum enable a displacement between said two positions;

the valve comprises an actuator, preferably a hydraulic actuator (15), which is preferably attached to the underside of the bonnet (9) and which is provided to turn the valve clack body (3). Valve clack body (3) is connected to a hinge device (5) about a cross shaft;

the valve comprises an arrangement for locking the trunk piston (7) in an advanced position;

the locking device of the trunk piston (7) comprises a hydraulic cylinder (16) which by a member is connected to a crank (17), pivotably mounted to the bonnet (9) at (18), and is adapted to move a yoke (20) between an upper position, in which the trunk piston (7) can be moved unobstructed, and a lower position, in which the yoke (20) is cooperating with a groove (21) in the trunk piston (7) locking it in an advanced position. The connection between the crank (17) and the yoke is designed in such a way that when the yoke (20) extends in a lower position, the bonnet carrying attached devices is freely able to be raised without the yoke (20) being retracted from the groove (21) in the trunk piston (7);

the device for providing hydraulic pressure for the actuators (15, 16) and devices for controlling the various functions of the valve, is located in a container mounted on top of the bonnet (9).

BRIEF DESCRIPTION OF DRAWINGS

An example of an embodiment according to the invention is shown in the accompanying drawings.

BEST MODE FOR CARRYING OUT THE INVENTION

Figure 1:
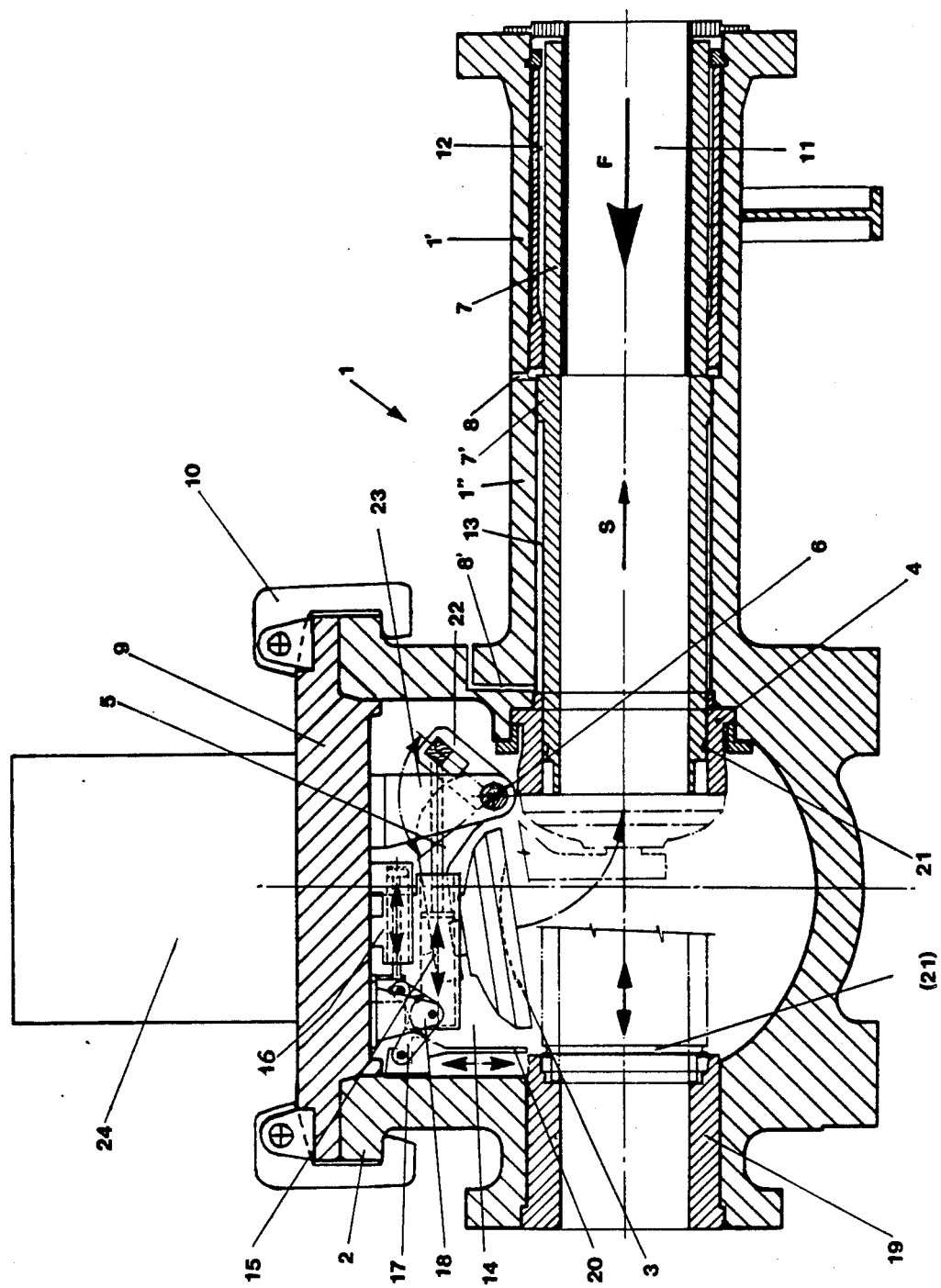
FIG. 1 is an axial section view through a closing valve according to the invention with the valve in closed position and with some components in side elevation (corresponding to the section line I—I of FIG. 2)
Figure 2:
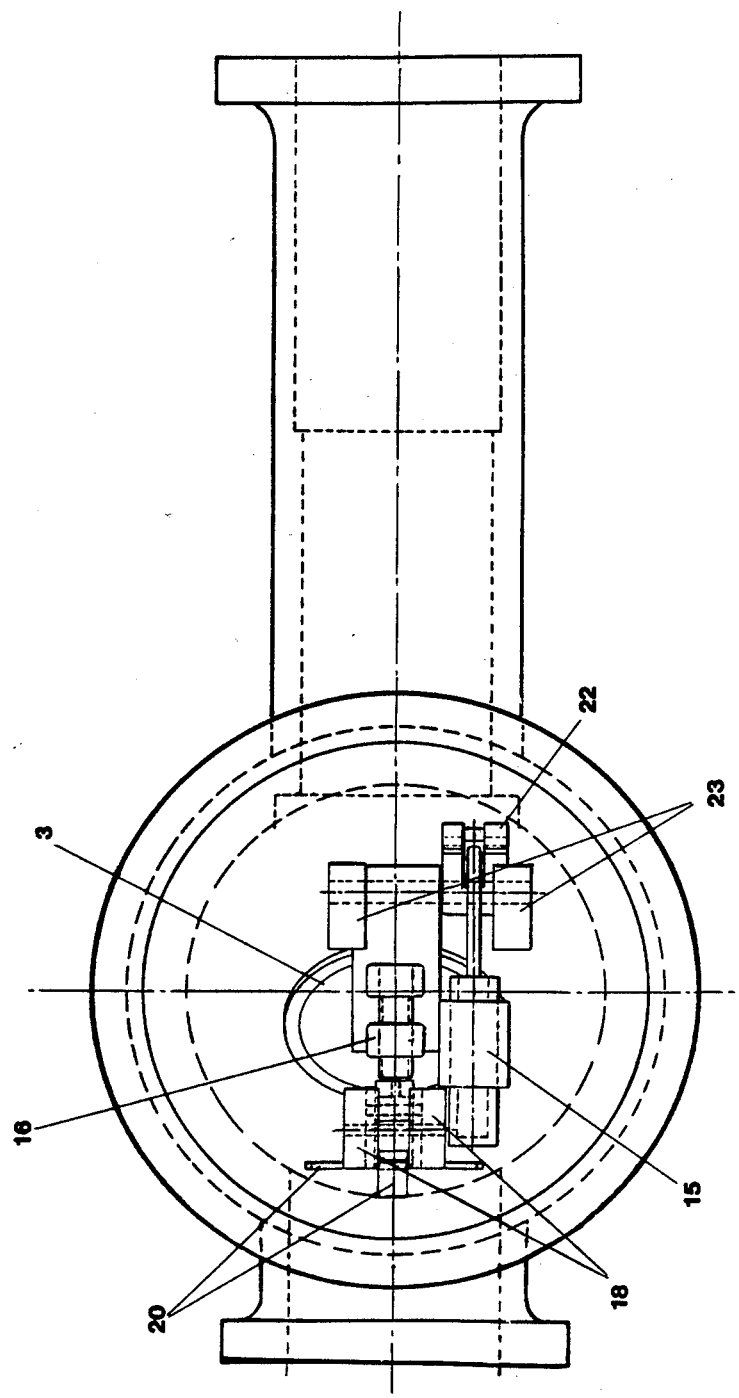
FIG. 2 is a top plan elevation of the valve according to FIG. 1, without the removable cover.

The shut-down valve shown in the drawings is intended for use in subwater/subliquid position, for instance in subsea pipelines for liquid/gas, a position in which it is desirable that the surrounding medium does not get an opportunity to penetrate into the pipeline or that the through-flowing fluid do get an opportunity to leak out when the valve is being overhauled.

The valve comprises a valve housing consisting of a cylindrical valve chamber 12, 13, which is intended for being orientated along the direction of flow F of the liquid/gas, and a radially placed valve chamber 14 which is formed by an upward, transverse connecting tube which is provided with a removable cover 9. The valve also comprises a clack-valve body 3 which is movable between an active closed position, cooperating tightly with a seat 4 in the valve housing, and an inactive position, in which the valve is open for through-flowing of liquid/gas in the direction F.

The clack-valve body 3 can be moved either passively by influence of the gravity and/or the flowing medium or the clack-valve body 3 can be operated by remote control by means of an actuator device. Preferably the clack-valve body 3 is operated by a hydraulic cylinder 15 which preferably is located underneath the bonnet 9.

The cylindrical valve chamber 1 is formed by two components 1', 1" arranged in extension of each other having mutually divergent diameters internal as well as external. The valve chamber 12, located in the rear relative to the direction of flow F, has the smallest internal diameter and forms together with a coaxial, internal pipe section 11 a cylindrically shaped steering for a trunk piston 7 which is axially displaceable in the cylindrical valve chamber 12, 13 of the valve housing between an advanced position in which the trunk piston 7 bearing against the terminal face of an end piece 19, in which the sleeve device 7 extends and covers the radial valve chamber 14 of the valve housing and in this way separating it from the cylindrical valve chamber 12, 13, in such a way that changing of valve components may occur without the surrounding medium coming into contact with the through-flowing fluid, and a retracted position in which the trunk piston 7 is retracted from the area of the radial valve chamber 14.

The trunk piston 7 is shaped with a radially protruding collar 7' with an external diameter which approximately corresponding to the internal diameter of the valve chamber part 13, in this way forming a reaction surface for a medium under pressure, respectively vacuum, which is supplied through openings 8 respectively 8' to cause a displacement of the sleeve 7 between its two outer positions.

In order to secure the position of the trunk piston 7 in an advanced position, the valve also comprises a suitable locking device. Preferably such a device comprises a hydraulic cylinder 16 which by a member is connected to a crank 17, pivotably mounted to the bonnet 9 at 18, and adapted for moving a yoke 20 between an upper position, in which the trunk piston 7 can be moved unobstructed, and a lower position, in which the yoke 20 is cooperating with a groove 21 in the trunk piston 7 locking it in its advanced position. This is achieved by designing the connection between the crank 17 and the yoke in such a way that when the yoke 20 extends in lower position, the bonnet with attached devices is freely able to be raised without the yoke 20 being retracted from the groove 21 in the trunk piston 7.

In a preferred embodiment of the valve according to the invention, the valve is provided with special packing devices (not shown) in order to ensure a tight connection between the trunk piston 7 and the valve chamber 1, and it is able to be activated from outside, for instance hydraulically.

Devices in order to provide hydraulic pressure to the actuators 15, 16 and devices for control of the valve function can be preferably be located in a chamber 24 which is placed on the top side of the bonnet 9.

The bonnet 9 is normally kept in position by means of pivotable clamps 10.

An end piece 19 serves as a check piece on the displacement of the sleeve 7 in the direction of the arrow F and also makes it possible to mount the sleeve 7 through the opening which appears when the end piece is removed.

All components may be produced of steel with coating.

In order to simplify the figures, packing rings and devices and hydraulic connectionlines have not be drawn.

During normal operation the fluid will flow in direction F. The trunk piston 7 will be located in an advanced position and if necessary the clack-valve body 3 is kept in an upper position by means of a hydraulic actuator 15. In a export-pipeline one may choose to employ such an actuator 15 if required, whereas an actuator will be required obligatory in an import-pipeline.

In certain emergency actuations it will be an absolute prerequisite to prevent the amount of liquid, located in the pipeline, to flow in an unwanted direction, or to prevent the surrounding medium, particularly seawater, to penetrate into the pipeline system. On signal from the platform, the trunk piston 7 can be forced to retract and the valve will be shut by the clack-valve body 3 when engaging the valve seat 4, either by influence of the gravity or by returning liquid in an export-pipeline or by means of an actuator A. This situation is shown with dotted lines in FIG. 1.

After rectifying the fault, which necessitated the shut-down of the valve, the valve can be reopened. This takes place by equalizing the pressure on both sides of the clack-valve body 3 up into the radial valve chamber 4. If the valve is provided with a hydraulic valve clack actuator 15, the clack-valve body 3 will suitably be moved by means of this device. Otherwise the clack-valve body 3 can be moved to the intended position by displacement of the trunk piston 7 to an advanced position; a movement which can be relieved by a suitable design of the clack-valve body 7.

Under certain circumstances it may be desirable to have a shut-down valve which above all is quick-acting. During normal operation the trunk piston will in this case be kept in a retracted position. This will enable a particularly rapid shut-down of the valve by actuating the clack-valve body. The trunk piston 7 will only be moved to an advanced position when it is desirable to let a pig pass through or when it is required to carry out repair- and maintenance work on valve packing faces, stem, clack-valve body etc. It is obvious that in this mode of operation, many of the vital components of the valve will be exposed to the corrosive and erosive influence of the following medium. By the means made available for carrying out routine check up of the valve according to the invention, however, the harmful effects which may occur in this mode of operation can be kept on a low level and may be totally avoided through a suitably prepared surveillance and maintenance schedule. The unique features of the valve are again illustrated.

When the trunk piston 7 in an advanced position secured by means of the yoke 20 the bonnet 9 with attached components can be removed without interrupting the operation of the pipeline. Before this operation, the packing devices between the valve chamber 1 and trunk piston 7 (not shown in the figures) should be activated and the pressure difference over the bonnet 9 equalized. It will now be possible to choose between different kinds of check maintenance and repair operations. In shallow water easier operation may be provided by divers after the bonnet is removed. Manned or unmanned underwater vehicles can also be used, particularly in deeper water. However, if one desires to fully exploit the particular features of the valve according to the invention, one may instead make use of the option of hoisting up the bonnet 9 and devices attached there to the surface of the sea where inspection etc. can be carried out on board a vessel or quite simply by replacing the bonnet 9 (with equipment) with a new or overhauled bonnet.

I claim:

1. In a shut-down valve for use in underwater pipelines for fluids having a valve housing including an inlet conduit and an outlet conduit, said inlet conduit defining a cylindrical valve chamber (12, 13) therein which is orientated along the direction of flow of the fluid through the pipeline; a radially placed valve chamber (14) which is closeable with a removable bonnet (9); a clack-valve body (3) which is movable between a closed position, cooperating tightly with a seat (4) in the valve housing, and an open position, in which the valve is open for through-flow of fluid in one direction through said inlet conduit, said valve chamber and into said outlet conduit; a trunk piston (7) which is axially displaceable in the cylindrical valve chamber (12, 13) of the valve housing between an advance position in which the trunk piston (7) extends over the entire radial valve chamber (14) of the valve housing and into engagement with said outlet conduit for separating the radial valve chamber (14) from the cylindrical valve chamber (12, 13) so that maintenance can occur without dismantling the valve, and a retracted position in which the trunk piston (7) is retracted from engagement with the outlet conduit through the area of the radial valve chamber (14) and back into said inlet conduit; the improvement comprising: a clack-valve body (3) pivotably mounted on bonnet (9), said clack-valve body being pivotably moved between said open and closed position by a first actuator means; and a locking means for locking trunk piston (7) in the advanced position, said locking means comprising a second actuator means for actuating a yoke (20) which is adapted to be moved between an upper position in which the trunk piston (7) can be moved unobstructed, and a lower position in which the yoke (20) cooperates with a groove (21) in the trunk piston (7) to lock the trunk piston (7) in an advanced position.

2. The shut-down valve of claim 1 wherein said second actuator means is a hydraulic cylinder (16) which is connected by a member to a crank (17) pivotably mounted relative to the bonnet (9) and the connection between the crank (17) and the yoke (20) is such that when the yoke (20) is in its lower position, the bonnet (9) together with its attached devices is able to be raised freely without moving the yoke (20) out of groove (21).

3. The shut-down valve of claim 1 wherein a device for providing hydraulic pressure for the actuators (15, 16) and devices for controlling the various functions of the valve, are located in a container mounted on top of the bonnet (9).

* * * * *